INVENTORS:
FRANK SOLOMON
ROBERT F. ENTERS
ATTORNEY

Aug. 2, 1966   F. SOLOMON ETAL   3,264,139
ELECTRICAL ACCUMULATOR OF THE SILVER-ZINC ALKALINE TYPE
Filed May 31, 1962   3 Sheets-Sheet 3

INVENTORS:
FRANK SOLOMON
ROBERT F. ENTERS
BY Irving Holtzman
ATTORNEY

# United States Patent Office 3,264,139
Patented August 2, 1966

3,264,139
ELECTRICAL ACCUMULATOR OF THE SILVER-ZINC ALKALINE TYPE
Frank Solomon, Lake Success, N.Y., and Robert F. Enters, Hackensack, N.J., assignors to Yardney International Corp., New York, N.Y., a corporation of New York
Filed May 31, 1962, Ser. No. 198,887
2 Claims. (Cl. 136—30)

This invention relates to an electrochemical current source, and more particularly to an electric accumulator having an electrode which tends to dissolve in the electrolyte on current-producing discharge. It has particular application to electric accumulators comprising a zinc electrode and an electrode of a metal more electropositive than zinc, e.g. silver, separated from each other by semipermeable separator means, the accumulator employing an alkaline electrolyte such as an aqueous solution of potassium hydroxide.

It is well known in the art that zinc tends to dissolve in the alkaline electrolyte of the above mentioned zinc accumulators during the current-producing discharge with the attendant formation of potassium zincate. It is especially difficult to plate this dissolved zinc back on the negative support in a uniform, coherent layer upon the subsequent recharge. Furthermore, it is found that alkaline zinc accumulators which have a relatively large ratio of electrolyte to negative active material become inoperative in comparatively few cycles because the sponge zinc formed on recharging the accumulator works its way to the bottom of the cell container. This is so since the specific gravity of potassium-zincate is greater than that of the original potassium hydroxide electrolyte. Because of these phenomena, much previous effort in the art has been devoted to devising means to immobilize the zinc active material.

A significant advance in the state of the art was made by André (U.S. Patent No. 2,594,709) who reduced the quantity of electrolyte to so great an extent that only a very minor quantity of zinc dissolved in the course of a discharge. The electrolyte became quickly saturated with dissolved zinc and the major part of the discharge proceeded according to a reaction whereby the zinc was oxidized to solid zinc oxide, which remained substantially in place and was thus available for the following recharge at the spot where it was needed. The resultant electrode was a compact mass rather than an uncontrolled pulverulent sponge. Despite the major improvement introduced by the reduction in the quantity of electrolyte, it was nevertheless found that with continuing cycling the negative electrodes became badly corroded, albeit more slowly than previously, as a result of the cyclic dissolving and replating of the zinc active materal; this effect was particularly noticeable at the electrode edges.

In accordance with the present invention, the contact between the active soluble electrode material, e.g. zinc, and the corrosive alkaline electrolyte is brought to an irreducible minimum. Therefore the cyclic corrosion of this negative electrode is avoided to a significantly greater extent than has hitherto been accomplished. This is brought about by enclosing each positive plate and its associated pair of negative plates in an individual tightly fitting electrolyte-impermeable wrapper, which isolates the couple from the supply of electrolyte normally present along the edges, top, and bottom of the zinc plates. The outside wrapper is open only along its top edge, which is normally located at or above the surface of the electrolyte.

It is accordingly an object of the present invention to provide an electrode assembly of reduced corrosive tendencies.

It is a further object of this invention to provide an accumulator incorporating such an electrode assembly.

Other and more detailed objects of this invention will be apparent from the following description and the accompanying drawing wherein.

As mentioned above, an aspect of the present invention involves the use of an electrolyte-impermeable outer wrapper. While the essential characteristic of the wrapper is its impermability to the electrolyte, it is advantageously made of a film-type plastic such as is typified by polyethylene because this type of material combines the desirable features of being available in extremely thin and light-weight gauges with low cost and technical attractiveness.

As mentioned above, this invention is applicable to accumulators having an electrode which tends to dissolve in the electrolyte during current-producing discharge. It is specifically described below with reference to the silver-zinc system.

Figure 1:
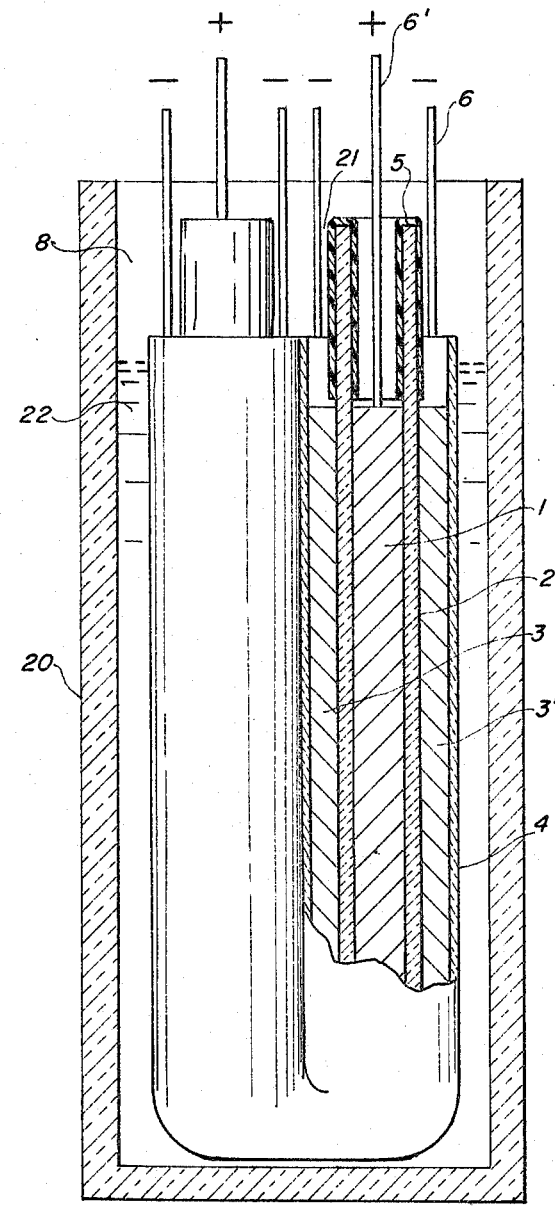
FIG. 1 is a partial cross-sectional view of an accumulator embodying the present invention, illustrating a U-wrapped set of electrodes, the outer wrap being removed from the right leg of the U to show the details of the assembly.

In the drawing, wherein the same numerals in the various views represent the same structure, the accumulator housing is shown at 20 in FIG. 1.

The positive electrode 1, e.g. a plate of silver oxide in the charged state, is enclosed in a conventional U wrap of semipermeable separator material 2, typically cellulose film, e.g. cellophane, or a suitable derivative thereof. Disposed on either side of the separator are negative plates 3 and 3', each negative plate in this construction co-operating with only one half of the associated positive plate. The material of these negative plates is preferably in the form of zinc in the charged condition. Surrounding this assembly of positive electrodes, separator, and negative electrodes is an electrolyte-impermeable outer sheath or wrapper 4, preferably of polyethylene, which shields the negatives from the adjacent electrolyte. Because the cellulosic separator 2 is attacked by the combined action of oxygen and strong bases, one may protect the cellulose from contact with the cell atmosphere by slipping an open double-layered polyethylene sleeve 5 over the top of the separator 2. Sleeve 5 is made from a section of cylindrical polyethylene casing material of about 1 to 5 mils in thickness by turning a portion thereof inside out, thereby forming a double-layered sleeve. It may be noted incidentally that this arrangement also provides a narrow opening 21 along the top of the negative electrode for the ingress of electrolyte, while still allowing for the full protection of the cellulosic separator. The negative leads 6 and the positive leads 6' are brought out in conventional fashion.

It is apparent from FIG. 1 that the excess electrolyte 22 in the cell is isolated in what may be termed a third compartment. Since the wrapper 4 is impermeable according to the invention, it will ordinarily not be involved in the electrochemical functioning of the cell.

The gauge of the cellophane separator material 2 and outer polyethylene wrapper 4 employed in this embodiment may vary. In a preferred form of the invention, the cellophane film material may have a gauge of about 3 or 4 mils whereas the polyethylene may vary from 1 to 5 mils.

Figure 2:
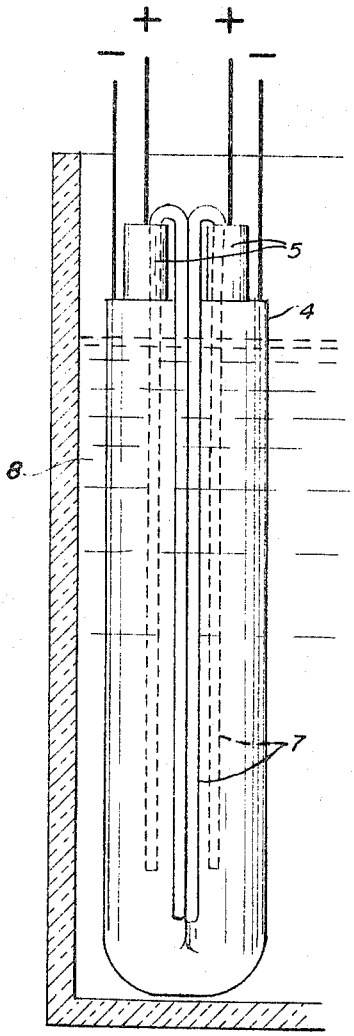
FIG. 2 is a cross-sectional view, similar to that shown in FIG. 1, of another embodiment of the invention, illustrating the use of an irrigating wick to bring electrolyte into the positive electrode compartment.

FIG. 2 depicts an arrangement for making the surplus electrolyte available during the charge, when it is needed, while still keeping it isolated from the negative plates as required in the practice of this invention. Experimentation has shown that during a charge, for reasons which are only partially understood, the positive plates which are completely enclosed (except at the tops) by the separator tend to become so dry that they can no longer effectively take charge and become polarized. The surplus electrolyte in the cell may be rendered available by incorporation of a wick 7 running from the face of the positive plate 1, as shown by dotted lines, over the top of the separator 2 and sleeve 5, and down into the third compartment 8 containing the excess electrolyte of the cell.

The wick may be made of a thin fibrous felt material which is resistant to alkali and to oxidation, such as nylon or dynel felt. Since the direction of electro-osmosis during the charge is towards the negative plates, it follows that electrolyte which is carried to the positive plates from the third compartment by the wick system will not only irrigate the positives but diffuse through the separator membrane to the negatives, thus rendering the negatives properly wetted. Any excess electrolyte which diffuses to the negatives will overflow from the top of the wrapper 4 of impermeable material, and thus there will still not be a surplus of negative electrolyte available to attack the negatives during discharge of the cell.

Figure 3:
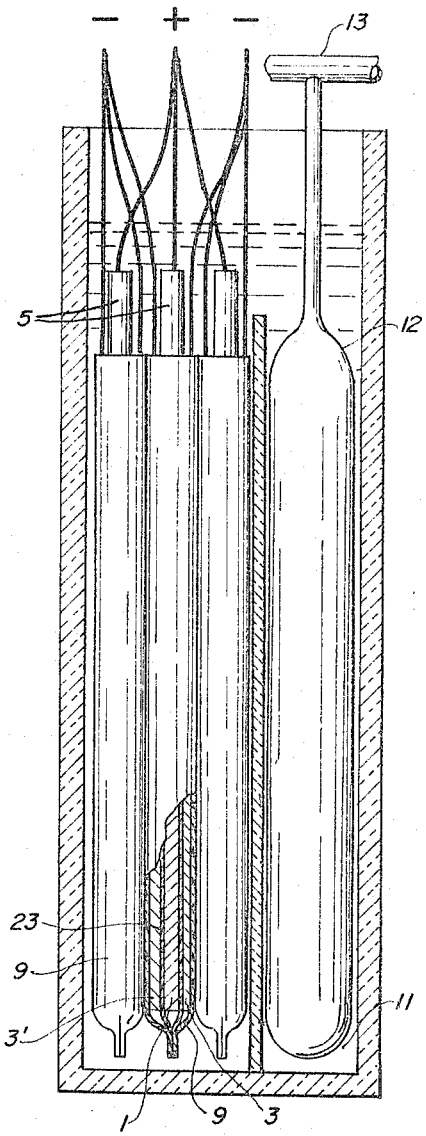
FIG. 3 is a cross-sectional view, similar to that shown in FIG. 1, of still another embodiment of this invention, illustrating the use of a bladder irrigation system and individual bags (as distinguished from the U wrap mentioned above) for holding the electrodes and separator.

Another embodiment of the invention is shown in FIG. 3. It is possible to avoid the use of the U construction by wrapping the positive plate 1 in a bag 23 of semipermeable separator material having a suitable closure on the bottom of the bag. A positive plate so enveloped may be associated as before with a pair of half negatives 3 and 3', and may then be enclosed in a sheath of impermeable material as shown at 9. If the sheath 9 is made of a heat-sealable material, such as polyethylene, it may be heat sealed into a bag.

The invention may advantageously be practiced in combination with means for providing periodic rewetting or irrigation of the positive plates during charge as described in U.S. Patent No. 2,932,681. As also illustrated in FIG. 3, an auxiliary electrolyte compartment 11 is provided with a bladder 12 which is connected to an air manifold 13. This is capable of displacing a sufficient volume of electrolyte, when inflated, to cover the tops of the separator bags, thus allowing electrolyte to pour down into the positive plate compartments to accomplish the intended irrigation.

Figures 4, 5:
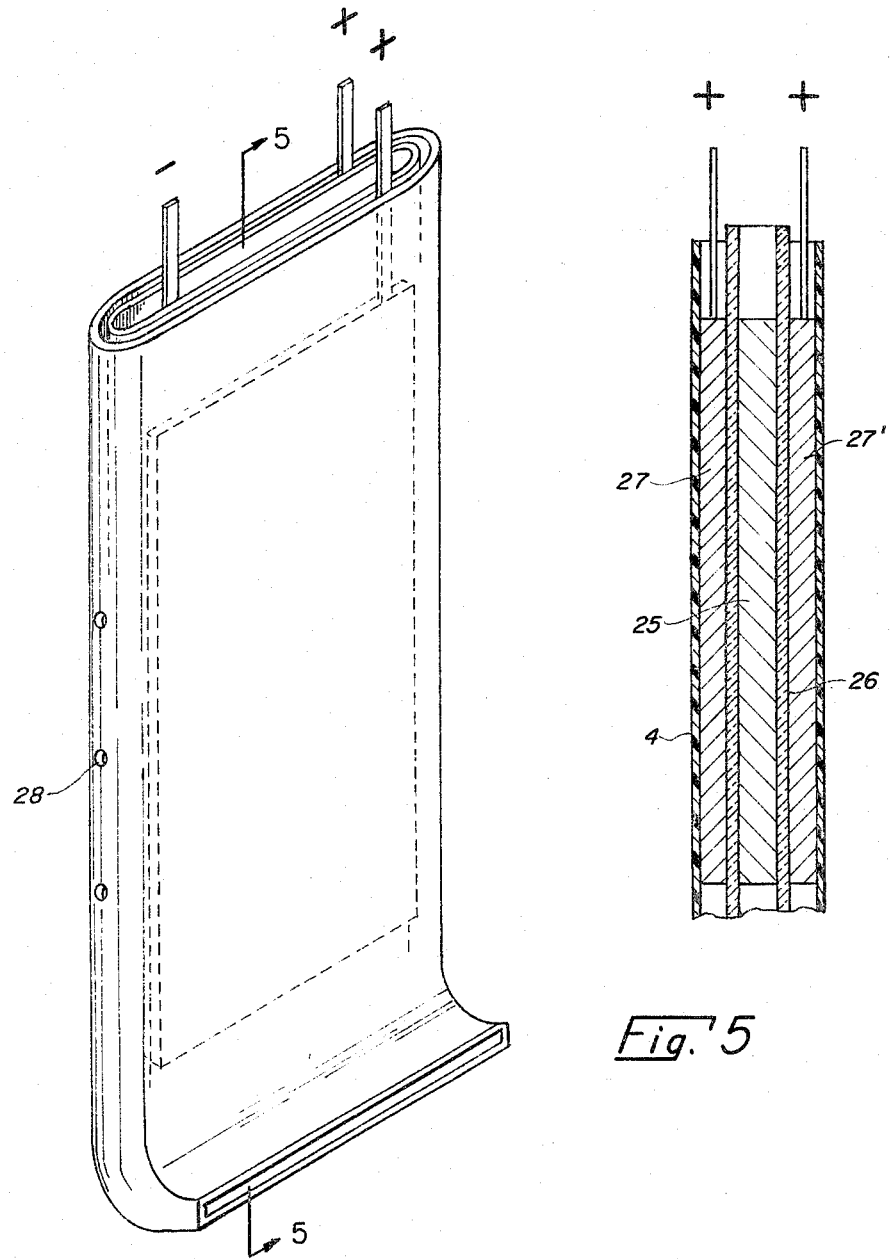
FIG. 4 is a perspective view partly in section of another electrode assembly embodying this invention.
FIG. 5 is a cross-sectional view of the embodiment of this invention shown in FIG. 4, taken along the line 5—5 thereof.

In the embodiment of this invention shown in FIGS. 4 and 5, which illustrates one half of a U-shaped assembly, a full size negative 25, e.g. a zinc electrode, is located in each arm of the U wrap of the semipermeable separator 26. Two half-size positive (e.g. silver) electrodes 27 and 27' are positioned on opposite sides of the negative plate 25 and the assembly is encompassed by the polyethylene wrap 4. Each of the half-size positive plates referred to has a capacity sufficient to service only one half the capacity of the negative electrode in conjunction with which it is employed.

For the purpose of irrigating the positive electrode during charge, the polyethylene wrap 4 is provided with a few irrigating holes 28, preferably located in the middle third of each arm of the U below the electrolyte surface. These holes are very small when compared with the overall size of the arm of the U. Their purpose is to allow sufficient electrolyte to pass into the positive compartment (restricted irrigation) so as to wet the positive electrodes while minimizing the circulation of electrolyte from the interior of the positive compartment out into the space surrounding the polyethylene wrap. The size and number of holes may vary. In general, in a wrap wherein the size of an arm of the U is about 32 inches long, the holes may be $\frac{1}{16}$ of an inch in diameter and the number of holes is about 3.

The location of the irrigation holes in the middle third of the wrap has its particular advantage. Experience has shown that, during cycling, metallic zinc tends to accumulate in the bend of the U-shaped system. The openings in the polyethylene wrap of this embodiment are kept above this area.

It will be apparent to those skilled in the art that the practice of the subject invention will allow a substantial reduction in the deleterious attack of the caustic electrolyte on the partially soluble zinc electrode by minimizing the quantity of electrolyte available to dissolve zinc during a discharge. It is further clear that an additional benefit is attained by reducing the exposure of the main separator material to the combined attack of oxygen and alkali. Lastly it is apparent that the restricted availability of the electrolyte to the negatives may be coupled with arrangements which allow full irrigation to the positive plates in accordance with their requirements for additional electrolyte during charge.

Whereas the invention has been described with reference to specific forms thereof, it will be understood that many changes and modifications may be made without departing from the spirit of this invention.

What is claimed is:

1. An alkaline accumulator comprising a housing which forms a chamber for an electrolyte, an electrolyte in said chamber, an electrode assembly in said chamber including at least one upright zinc/zinc-oxide electrode soluble in said electrolyte and at least one further upright silver-oxide/silver electrode, a semipermeable separator means between the electrodes forming part of said assembly, an electrolyte-impermeable wrapper surrounding said assembly while defining a compartment for excess electrolyte between said wrapper and said housing, said wrapper extending upwardly beyond at least one of said electrodes and being open thereabove and above the normal electrolyte level in said chamber, and limited-circulation means including an inflatable element in said compartment for intermittently displacing electrolyte therefrom into the interior of said wrapper across the top thereof.

2. An accumulator as defined in claim 1 wherein said electrode assembly includes a central zinc/zinc-oxide electrode and at least two of said further silver-oxide/silver electrodes flanking said central electrode, said semipermeable separator means forming a sleeve for said central electrode, said separator means projecting above said assembly and said wrapper, said accumulator further comprising a protective covering of an electrolyte permeable material on the inner and outer faces of the projecting upper portion of said separator means.

References Cited by the Examiner

UNITED STATES PATENTS

| | | | |
|---|---|---|---|
| 2,584,117 | 2/1952 | Elrod. | |
| 2,759,039 | 8/1956 | Clark | 136—148 |
| 2,824,165 | 2/1958 | Marsal | 136—122 |
| 2,851,509 | 9/1958 | Pasquale et al. | 136—6 |
| 2,866,841 | 12/1958 | Zahn | 136—147 |
| 3,013,099 | 12/1961 | Mendelsohn | 136—146 |
| 3,094,438 | 6/1963 | Daley et al. | 136—6 |

FOREIGN PATENTS

| | | |
|---|---|---|
| 248,942 | 3/1926 | Great Britain. |
| 451,671 | 8/1936 | Great Britain. |

WINSTON A. DOUGLAS, *Primary Examiner.*

MURRAY TILLMAN, *Examiner.*

B. J. OHLENDORF, *Assistant Examiner.*